United States Patent [19]
Strothmann

[11] Patent Number: 5,540,296
[45] Date of Patent: Jul. 30, 1996

[54] ELECTRIC AUXILIARY DRIVE FOR A TRAVELLING DEVICE PRIMARILY DRIVEN, IN PARTICULAR DRAWN OR PUSHED, BY HUMAN OR ANIMAL POWER

[76] Inventor: Rolf Strothmann, Am Staden 18, 66121 Saarbrücken, Germany

[21] Appl. No.: 397,135

[22] PCT Filed: Jul. 21, 1994

[86] PCT No.: PCT/EP94/02399

§ 371 Date: Mar. 10, 1995

§ 102(e) Date: Mar. 10, 1994

[87] PCT Pub. No.: WO95/03096

PCT Pub. Date: Feb. 2, 1995

[30] Foreign Application Priority Data

Jul. 24, 1993 [DE] Germany ............ 93 11 075 U

[51] Int. Cl.[6] .................................................. B62D 51/04
[52] U.S. Cl. .................... 180/19.3; 180/65.5; 180/332; 180/165
[58] Field of Search .................... 180/19.1, 19.2, 180/19.3, 6.48, 6.5, 65.1, 65.5, 65.8, 315, 332, 333, 165

[56] References Cited

U.S. PATENT DOCUMENTS

| | | | |
|---|---|---|---|
| 2,937,706 | 5/1960 | Chandler | 180/19.3 |
| 3,364,417 | 1/1968 | Norton et al. | 180/19.3 |
| 3,976,151 | 8/1976 | Farque | 180/6.5 |
| 4,081,047 | 3/1978 | Lovell et al. | 180/19.3 |
| 4,427,084 | 1/1984 | Savard, Jr. | 180/19.3 |
| 4,541,051 | 9/1985 | Jarret et al. | 180/6.5 |
| 4,697,661 | 10/1987 | Pajerski et al. | 180/19.3 |
| 5,180,023 | 1/1993 | Reimers | 180/19.3 |
| 5,335,740 | 8/1994 | Meyer et al. | 180/19.3 |
| 5,406,674 | 4/1995 | Lawter et al. | 180/19.3 |
| 5,425,069 | 6/1995 | Pellegrino et al. | 378/198 |

FOREIGN PATENT DOCUMENTS

| | | | |
|---|---|---|---|
| 2027409 | 12/1971 | Germany. | |
| 2206753 | 1/1989 | United Kingdom. | |
| 2224984 | 5/1990 | United Kingdom | 180/65.5 |

*Primary Examiner*—Kevin T. Hurley
*Attorney, Agent, or Firm*—Friedrich Kueffner

[57] ABSTRACT

An auxiliary drive for a travelling device has a boosting effect when the driving power requirements are high and has a regenerative effect when the driving power requirements are low or negative. The auxiliary drive is provided with a measurement device for the primary driving power and with a control that increases or diminishes the generated torque by reducing or increasing the regenerative braking torque when a predetermined primary driving force is exceeded or not reached, respectively. The use of regenerative braking to charge the batteries allows small and relatively light batteries to be used.

24 Claims, 8 Drawing Sheets

ELECTRIC AUXILIARY DRIVE FOR A TRAVELLING DEVICE PRIMARILY DRIVEN, IN PARTICULAR DRAWN OR PUSHED, BY HUMAN OR ANIMAL POWER

BACKGROUND OF THE INVENTION

1. Field of the Invention

The invention relates to an electric auxiliary drive for a travelling device primarily driven, in particular drawn or pushed, by human or animal power.

2. Description of the Related Art

The field of application of the invention is, for example, that of golf caddies and industrial carts, but much more besides.

For the two-wheeled or three-wheeled golf caddies normally drawn or pushed by the user, with a golf bag or the like clipped on them, electric drives of the wheels are also known. They are generally controlled, as required, by means of an adjusting lever arranged close to the handle of the golf caddie. The battery required is thus designed to be sufficient in any case for an average round of 18 holes. Consequently, however, it is of a not inconsiderable weight, which makes handling it, or the golf caddie, more difficult, and in some cases impossible, in particular on uneven ground.

SUMMARY OF THE INVENTION

The object of the invention is to provide an energy-saving drive which is altogether easier to handle and is also convenient to use.

According to the invention, this object is achieved by an electric auxiliary drive for a travelling device primarily driven, in particularly drawn or pushed, by human or animal power, which has a boosting effect whenever the driving force, requirements are high and has a regenerative effect whenever the driving force, requirements are low, in particular negative, and is provided with a measuring device for the primarily exerted driving force, and with a control such that, whenever a predetermined primary driving force, is exceeded or not reached, said control resets the predetermined primary driving force, by increasing or reducing the generated torque or by reducing or increasing the regenerative braking torque.

The invention thus assumes a basic load carried by the user himself, which can be set at a comfortable level and spares the user from major exertion. Since, on the other hand, energy is saved compared to a full power drive, a lighter battery is sufficient. The battery can be all the lighter since, apart from the efficiency-determined loss, energy used when going uphill is recovered when going downhill and, moreover, even when on level ground it is always charged to a certain extent, provided that the internal losses or losses due to unevennesses of the ground do not use up the predetermined primary driving force. Furthermore, the control is automated and does not require actuation. In favorable operating conditions, the losses occurring can be fully compensated and there is no need for external charging of the battery. Consequently, there is also no need for the infrastructure otherwise always required for battery-operated vehicles.

The predetermined primary driving force which the human or animal has to apply can preferably be changed arbitrarily and/or by a control program.

Thus, for example in the case of a golf caddie, it can be set as desired to 10 to 15N and can be reduced after a certain time by a control program in order to compensate for increasing fatigue. It may be reduced when going uphill, when the user's own body weight makes him exert himself more, or else be increased in order to remain truer to natural conditions. It may also be increased when going down steeper inclines; the pull on the golf caddie then reduces the abrupt stopping of the body movement with each step. However, due to the limit of the regenerative braking effect, it may be necessary for the user himself also to perform braking. In this case, it may even be provided to switch over to power braking. If appropriate, the predetermined primary driving force may also be greatly increased considering the charging state of the battery.

Particularly suitable for the auxiliary drive according to the invention are three-phase synchronous motors. They can be controlled well and can operate in reverse as a dynamo.

According to a further advantageous refinement of the invention, two coaxial wheels are in each case provided with a motor and are individually controlled, the proportions of the primary driving force going to the different wheels being determined from a measurement of a bending moment or a transverse force occurring in a device frame. A torque exerted by the wheels on the device frame or via the device frame on the wheels produces corresponding bending moments and transverse forces in the device frame. The separate control of the wheels also makes it easier to move in a curve, in particular turning in place. This advantage comes into full effect, for example, in the case of industrial carts, which, for instance in warehouses, are used only on level ground. Furthermore, with this type of use, however, the boosting and regenerative braking always associated with the auxiliary drive according to the invention are also effective during starting and stopping.

The measuring of a bending moment occurring in the frame is possible, for example, in a very simple way with a plurality of strain gages attached to various suitable points of a draw bar, which the frame generally has in some form or other.

The simple drawing or pushing force may also be measured in a very simple way by means of at least one strain gage attached at a bend of the draw bar, preferably at the bend of the draw bar forming the handle. A stronger drawing force extends the bend more, admittedly only extremely slightly, but perceptibly for the strain gage.

A particularly favorable type of design which the invention allows by virtue of the reduced battery size is that two wheels with gearlessly integrated motors are arranged on an axle of the form of an elongate case, in which the batteries are housed, and if appropriate the control is housed. In this case, the batteries are scarcely evident.

Yet another step in this direction is that the wheels are equipped with integrated motors, preferably gearless, and with in each case their own, integrated batteries, preferably furthermore with the associated control.

The integration of the batteries into the wheels together with the motors means that, unlike in the case of simple integration of the motors, there is no need for energy transmission connections of the wheels. With the exception of the control connections and the connection to the measuring device, the wheels are absolutely independent units. This is made possible by the reduction of the required battery capacity associated with the invention, while always maintaining an adequate charging state.

The wheels with integrated motor need only then to be arranged on axle journals which can be fastened by means of rotationally secure plug connections. According to an advantageous development of the invention, combined with the mechanical plug connections are electric plug connections for the lines leading into the wheel, i.e. control lines and energy supply lines in the case of the wheels with only integrated motors, and only control lines in the case of the wheels with integrated motor and integrated batteries.

Measuring devices, possible in principle, for the primary driving force have already been mentioned above. Preferably, however, for measuring the primary driving force if appropriate also the torque, a measuring unit is arranged in a device frame at a point, preferably a crosspoint of the frame structure, through which the entire flow of force of the primary driving force passes, preferably between a handle and a draw bar or at the other end of the draw bar. This concentration of the measurement in a separate unit built into the frame structure is expedient in terms of production engineering and, in addition, makes it possible to create favorable conditions, particularly for the measurement. In this respect, it is proposed as a further advantageous development of the invention that the measuring unit comprises a molding which is preferably embedded in a plastics compound and on which clearances are used to create webs where bending stresses are concentrated, to which strain gages are attached. Pairs of strain gages are proposed, which are arranged next to one another in such a way that the one strain gage is stretched when the other is compressed, and which are connected in a bridge circuit. Consequently, unbalances are largely compensated. The embedding of the measuring unit may likewise be incorporated in a force-transmitting manner into the frame structure. Consequently, the said molding can be protected against overloads, in particular with regard to force transmissions in a direction other than the intended bending stresses, in particular transversely thereto.

For implementing the design of the invention on a golf caddie, it is proposed that the said case is arranged as a central body of a mounting for the golf bag, having two bars extending rigidly from it, which converge, at the end are angled upward and away from each other and are continued by a draw bar which at its end is provided with a handle, and having a carrying rack which is fastened at two joints on it and can be swung out of a supporting position up against the two bars, and that the measuring unit is arranged at the transition between the said bars and the draw bar or between the latter and the handle. This is a particularly lightweight configuration appropriate for the drive according to the invention and made possible by the invention in the case of a golf caddie which in any case is partially driven.

Golf caddies and industrial carts have already been mentioned as constituting the field of application of the invention. To be expressly mentioned here as industrial carts which come into consideration are those for mail delivery and also shopping carts, as well as wheelchairs, bicycles, rickshaws and also bicycle rickshaws.

The drawings reproduce by example an embodiment of the invention.

DESCRIPTION OF THE PREFERRED EMBODIMENTS

Figure 1:
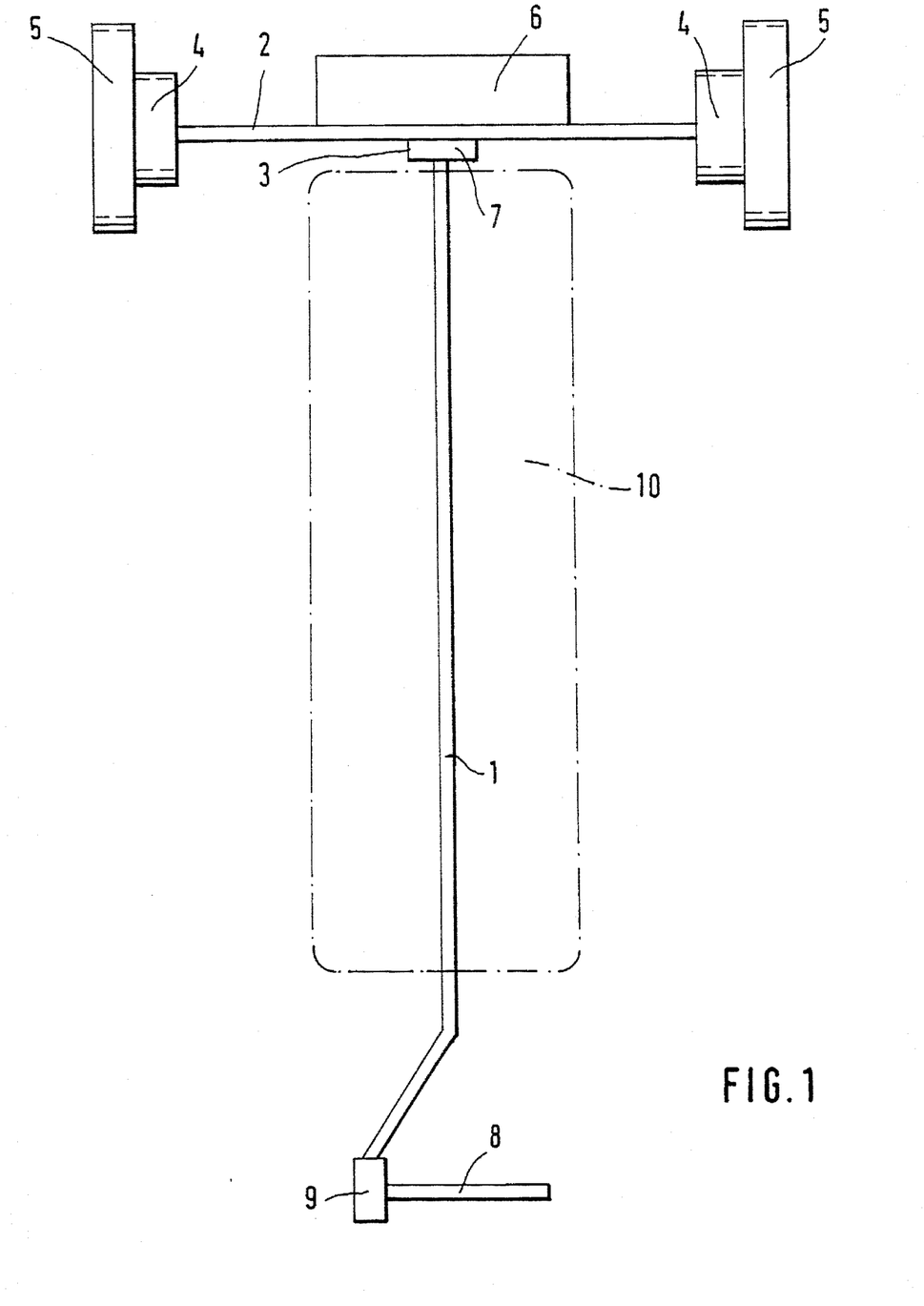
FIG. 1 schematically shows a golf caddie in plan view.

A device frame 3, substantially comprising a draw bar 1 and a cross-bar 2, has at the ends of the cross-bar 2 two wheels 5, in each case provided with a three-phase synchronous motor 4. Arranged on the center of the cross-bar 2 are a battery 6 and a control device 7. On the handle 8 of the draw bar i there is a measuring device 9. A golf bag 10 is indicated in outline by dash-dotted lines.

Figure 2:
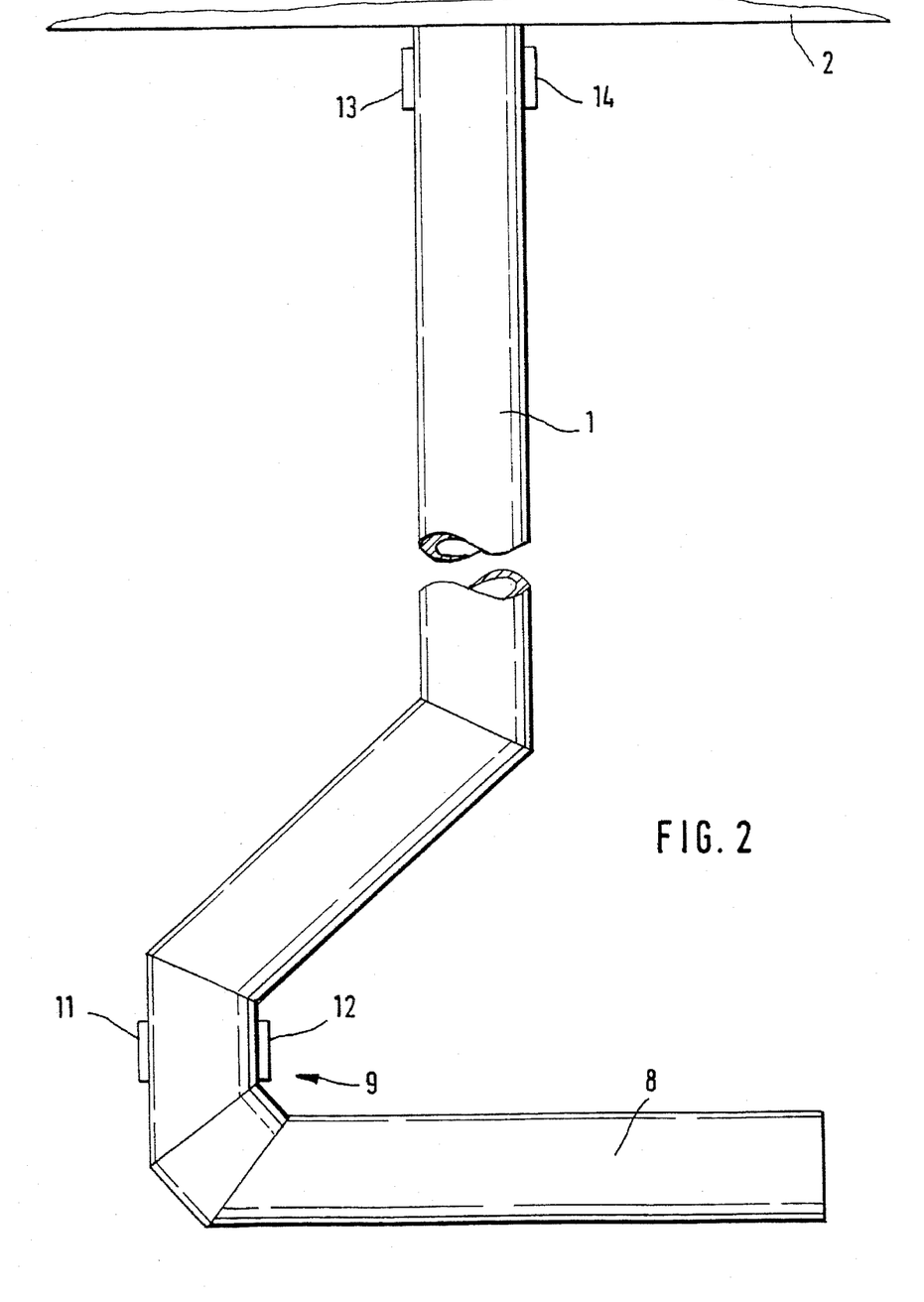
FIG. 2 shows a draw bar of the golf caddie in plan view on an enlarged scale.

The measuring device 9 comprises two strain gages 11 and 12, attached on the right and left in the bend of the handle 8. Two further strain gages 13 and 14 are attached on the right and left at the rear end of the draw bar 1.

The strain gages 11 and 12 are arranged in each case in a bridge circuit. The voltages of the two bridges are calculated respect to each other in the control device. This produces the basic loading of the two three-phase synchronous motors 4.

The strain gages 13 and 14 are likewise arranged in each case in a bridge circuit, and the voltages are calculated respect to each other in the control device. With the value obtained therefrom, the basic loading is distributed to the two three-phase synchronous motors according to conditions.

In detail:

When pulling straight ahead, because of the leverage of the handle 8 and the bending stress produced as a result in the region of the measuring device 9, the strain gage 12 is stretched and the strain gage 11 is compressed. If a limit is exceeded, the three-phase synchronous motors 4 fed by the battery 6 are switched on. This may be an on-off circuit. Preferably, however, a torque dependent on the pulling force is generated. The same applies for pushing, with the reverse situation that the strain gage 11 is stretched and the strain gage 12 is compressed.

If in addition to the pulling there is turning, a torque is produced in the frame 3. A bending stress is imparted to the draw bar I with respect to the cross-bar 3. Depending on the direction of turning, the strain gage 13 is stretched and the strain gage 14 is compressed, or vice versa. The voltage value obtained therefrom distributes the basic loading, predetermined by the measuring device 9, differently to the two three-phase synchronous motors 4 in a compensating manner. This distribution is also preferably quantitatively determined as a function of the torque.

Below the limit value at which the auxiliary drive is cut in, the three-phase synchronous motors are switched as generators to battery charging. In this case, the same pulling force is preferably always set, irrespective of the incline of the path being travelled, by corresponding charging work and consequently braking of the wheels.

The paired arrangement of the strain gages 11 and 12 and also 13 and 14, the voltages of which are calculated with respect to each other, largely excludes unbalances. The output signal is increased.

Figure 3:
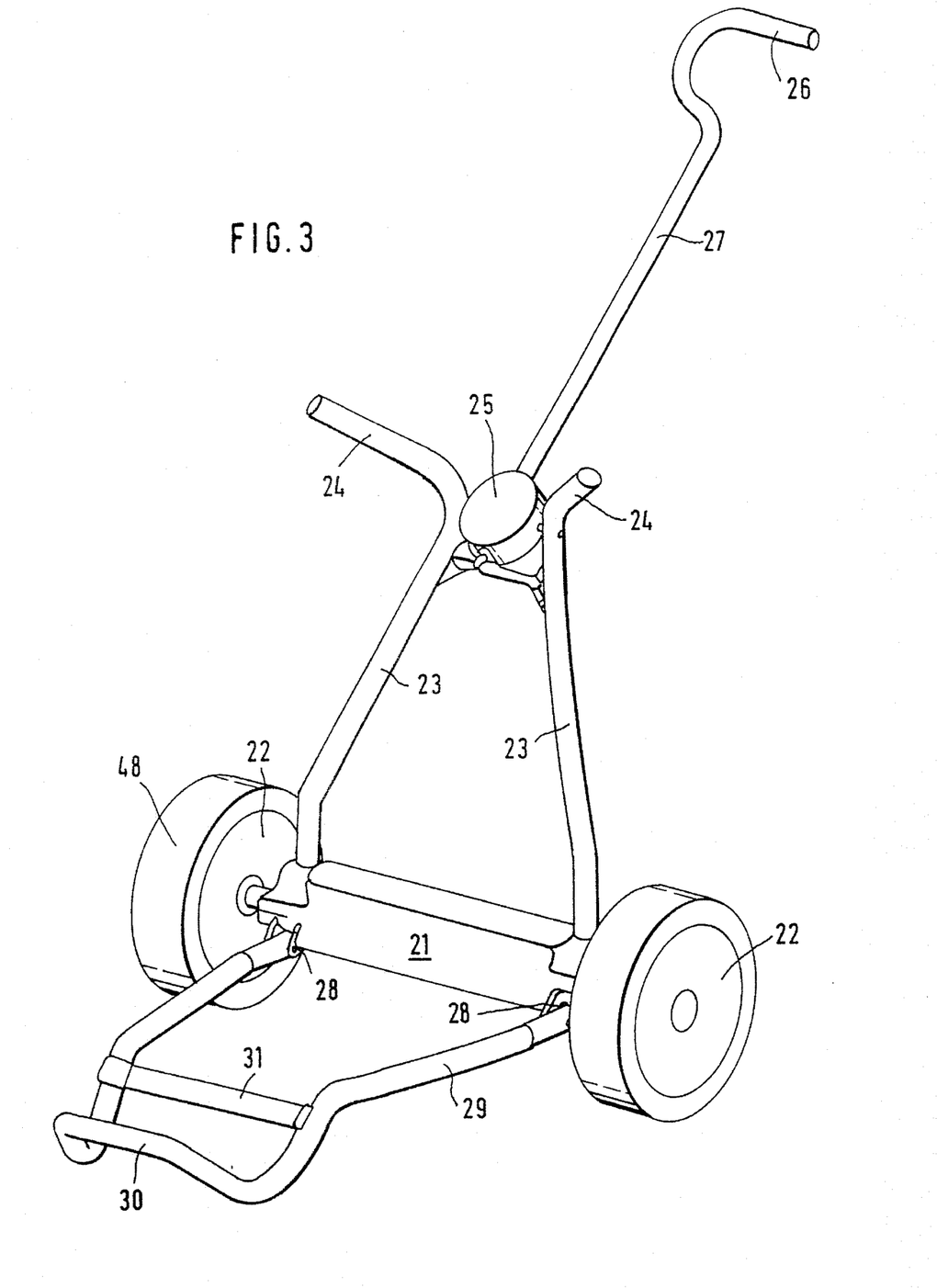
FIG. 3 shows a further golf caddie in isometric representation.
Figure 4:
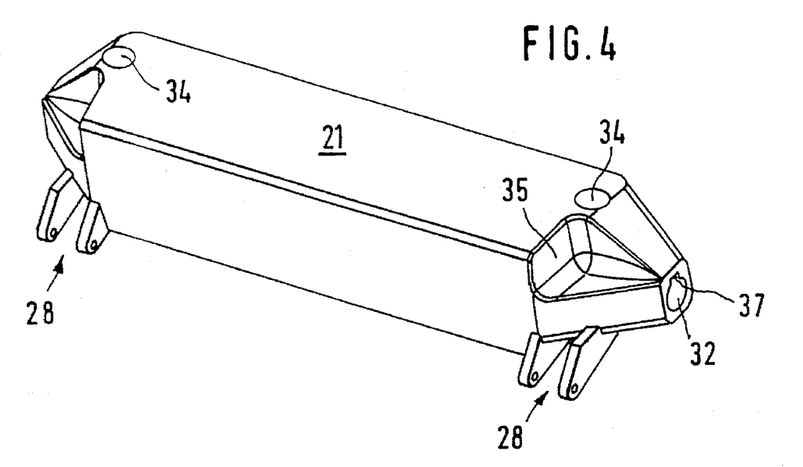
FIG. 4 shows, slightly modified, a detail from FIG. 3.

The golf caddie according to the FIG. 3 has two wheels 22 on an axle 21 in the form of a case. Integrated into the wheels 22 are motors, which are fed by batteries housed in the axle 21 in the form of a case. Two bars 23, rigidly fastened on the axle 21, are angled at their free ends 24 outward and upward and are connected by a measuring unit 25, which is adjoined by a draw bar 27 provided with a handle 26. Also attached on the axle 21, at two joints 28, is a carrying rack 29. In the position drawn, it is supported on the axle 21 by ends protruding beyond the joints 28 and can be swung up against the bars 23. A golf bag, supported by its bottom on an upwardly angled-off end section 30 of the carrying rack 29, can be placed on a strap 31, fitted just above said rack, and in between the ends 24 of the bars 23. FIG. 4 shows the axle 21 in the form of a case, with the modification that the ends of the case are tapered in approximately pyramid form. This produces a favorable flow of forces, with a socket 32 respectively formed in the taper for an axle journal 33 of one of the two wheels 22. At 34, the end stubs of the bars 23 are shown, next to them indentations 35.

Figure 5:
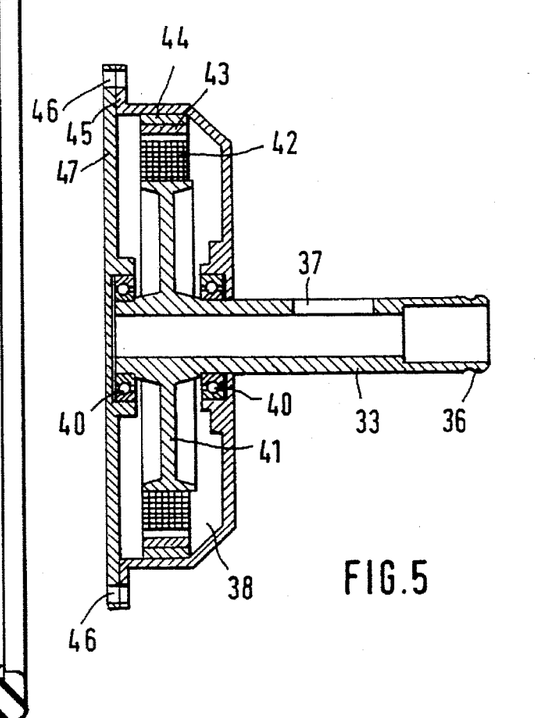
FIGS. 5 and 6 together show a wheel of the golf caddie according to FIG. 3.

As FIG. 5 reveals, the axle journal 33 to be pushed into the socket 32 has at the end a snap connection 36 in the socket 32 and, what is more, a torque securement in the form of a tongue-and-groove connection, of which the grooves 37 appear in the drawing.

The wheel 22 consequently has a mechanical plug connection. A plug connection combined with the latter for the required electrical connections is not drawn.

Figure 6:
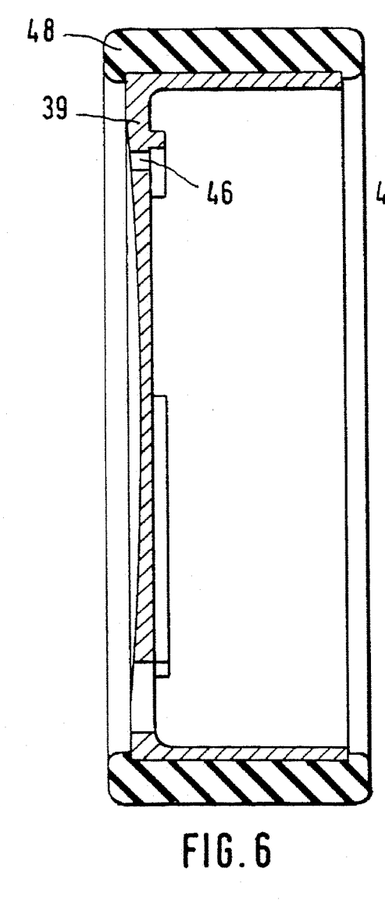

The wheel 22 is divided into a wheel core 38, shown in FIG. 5, and an outer part 39, shown in FIG. 6. The wheel core comprises a housing, which is rotatably mounted by bearings 40 on the axle journal 33 and in which there is arranged, on a stator plate 41 formed integrally with the axle journal 33, a circular row of field poles 42 and, opposite this on the rotatable housing, a row of magnets 43 with a back iron 44.

The outer part 39 acts with a centering fit on the wheel core 38 and has a plurality of screw connections with the latter, in each case at a radial projection 45, said connections being evident from the relevant drill holes 46 and being used at the same time to fasten a housing cover 47 of the wheel core 38. The outer part 39 bears a flexible tire 48.

The function of the drive of the golf caddie according to FIGS. 3 to 6 is the same as in the case of the golf caddie according to FIGS. 1 and 2. The strain gages are merely relocated into the measuring units 25 and the control is relocated into the case of the axle 21. A measuring unit, to be considered as similar to the measuring unit 25, can be seen in FIGS. 7 and 8.

Figure 7:
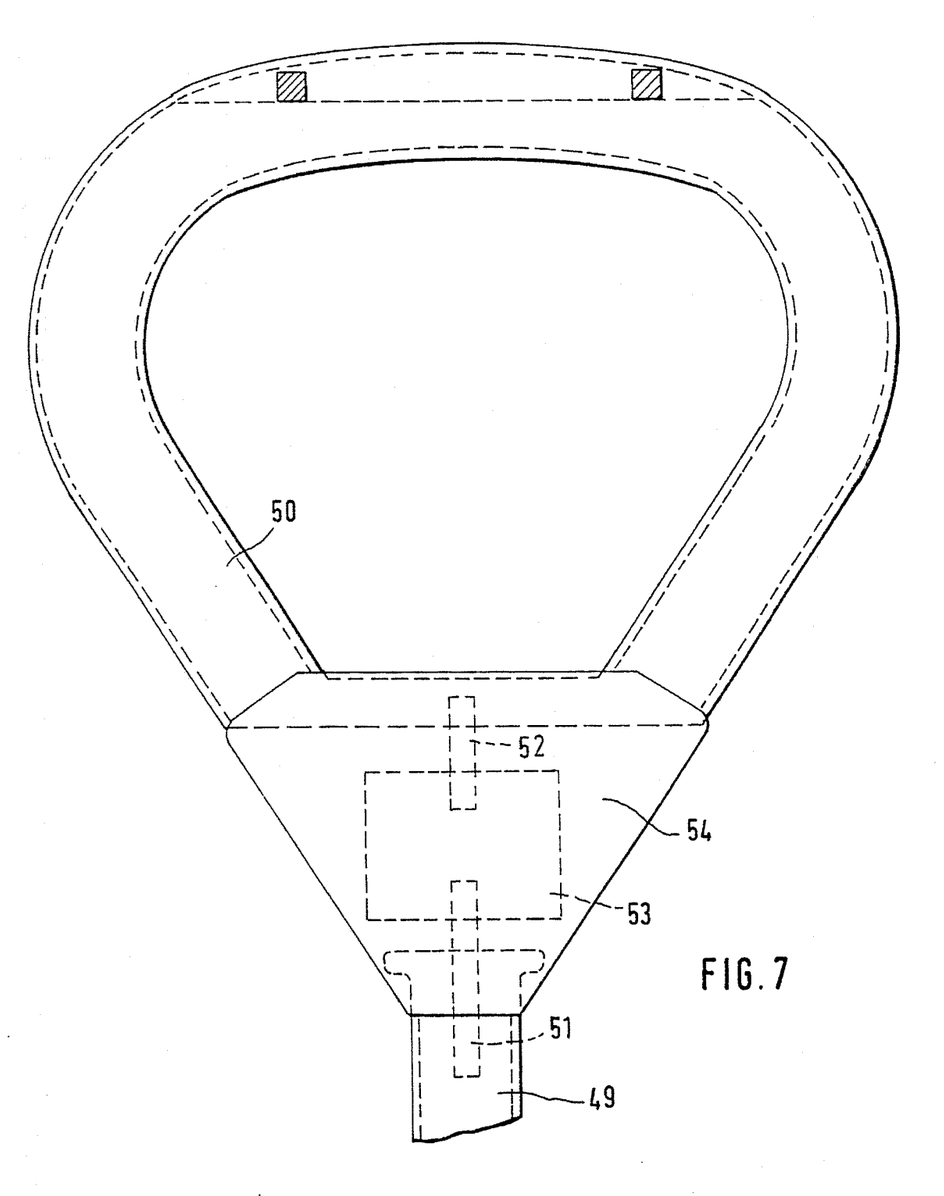
FIG. 7 shows a handle of another golf caddie in elevation.

FIG. 7 reveals a draw bar 49 and a ring-shaped handle 50, which are connected to each other by means of bolts 51 and 52 via a molding 53 and also by an embedding 54 of plastics compound, enclosing this arrangement.

Figure 8:
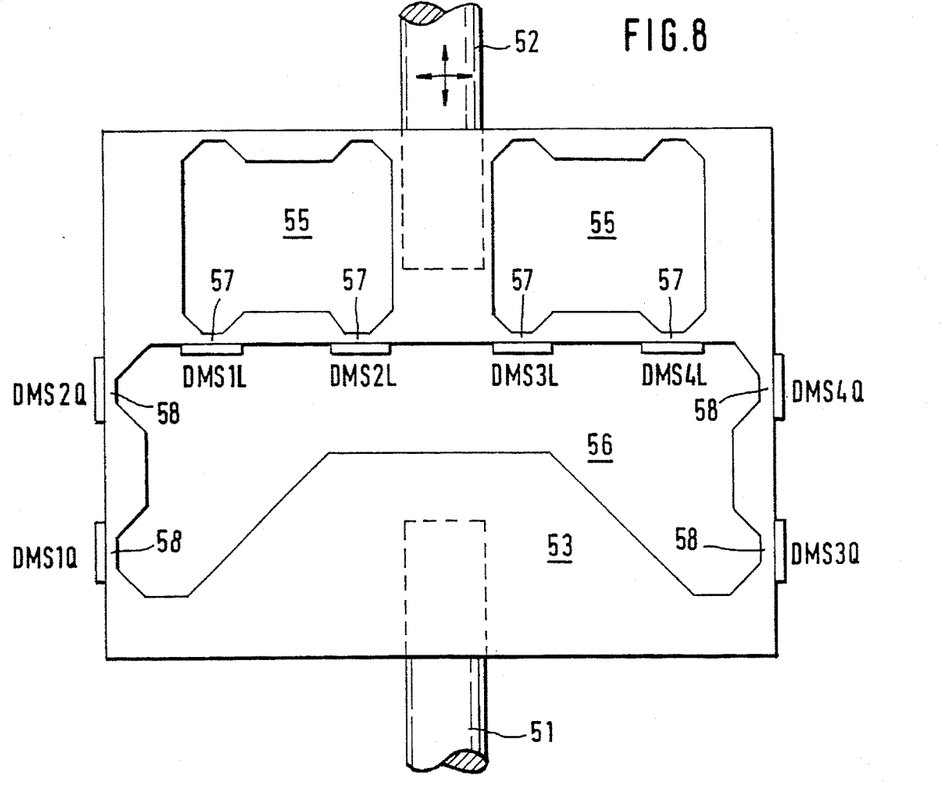
FIG. 8 shows an inner component part of the handle according to FIG. 7 on an enlarged scale.

The molding 53 is drawn on its own in FIG. 8, on an enlarged scale.

Altogether, it comprises a flat cuboid of aluminum, in which four webs 57 and four webs 58 are formed by clearances 55 and 56. Attached at the webs 57 are four strain gages, denoted by DMS 1L to DMS 4L, attached at the webs 58 are four strain gages denoted by DMS 1Q to DMS 3Q.

If tension occurs between the bolts 51 and 52, DMS 1L and DMS 4L are stretched and DMS 2L and DMS 3L are compressed. In the case of pressure, DMS 2L and DMS 3L are stretched and DMS 1L and DMS 4L are compressed. Transverse force of the bolt 52 with respect to the bolt 51 to the right stretches DMS 1Q and DMS 4Q and compresses DMS 2Q and DMS 3Q. Transverse force to the left stretches DMS 2Q and DMS 3Q and compresses DMS 1Q and DMS 4Q. The longitudinal force can be measured by a bridge circuit of the strain gages DMS 1L to DMS 4L, the transverse force can be measured by a bridge circuit of the strain gages DMS 1Q to DMS 4Q. By measuring the longitudinal force, the pulling or pushing forces acting on the draw bar 49 are determined. By measuring also the transverse force between the bolts 51 and 52, i.e. between the handle 50 and the draw bar 49, the torque transmitted from the or to the device frame is also acquired.

Figure 9:
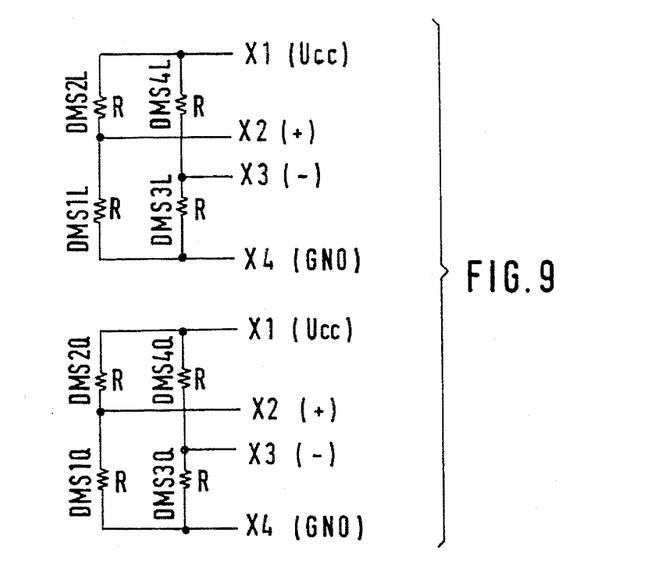
FIG. 9 shows bridge circuits formed by strain gages.

The arrangement of the strain gages DMS 1L to DMS 4L and DMS 1Q to DMS 4Q in the respective bridge circuit can be seen in FIG. 9. In each of the bridge circuits shown there, X2 and X3 denote terminals for the tapping of a measuring signal. X1 and X4 identify in both bridge circuits a terminal connection to a voltage source (Ucc) and to ground (GND), respectively. As FIG. 9 reveals, the individual strain gages DMS 1L to DMS 4L and also DMS 1Q to DMS 4Q are respectively interconnected in such a way to form a bridge that the strain gages provided in mutually corresponding bridge branch sections are deformed in opposite directions upon actuation of the draw bar 49. This accordingly also produces an opposing changing of the resistance ratio of the strain gages in the two bridge branches, which results in a considerable unbalance of the measuring bridge and consequently in a higher measuring sensitivity in comparison with a measuring bridge having a total of only two strain gages, provided in one bridge branch.

Further details, concerning in particular the motor control, are now explained with reference to FIG. 10. In the diagram shown there, a drive motor is denoted by the reference numeral 80, this preferably being a three-phase synchronous motor, as already mentioned in the previous description. The drive motor 80 is in connection with a motor operating circuit 81 for the direct activation of the motor 80. The motor 80 is supplied with a suitably controlled operating voltage via the operating circuit 81. In addition, the mode of operation of the motor, which can be used both as a motor and as a generator, is controlled via the motor operating circuit 81.

The motor 80 is also in connection with a rotor-position sensing device 82, which constantly generates measuring signals from which the respective angular position of the rotor can be determined. The rotor-position sensing device 82 is connected to a microprocessor unit 83, which receives the measuring signals generated. The microprocessor unit 83, serving as a central control device, is also connected to the motor operating circuit 81, the microprocessor unit 83 not only supplying signals for controlling the motor operating circuit but also, as still to be explained later, receiving signals from the motor operating circuit. The double-headed arrow drawn in between the motor operating circuit 81 and the microprocessor unit 83 is intended to indicate this bilateral exchange of signals.

Figure 10:
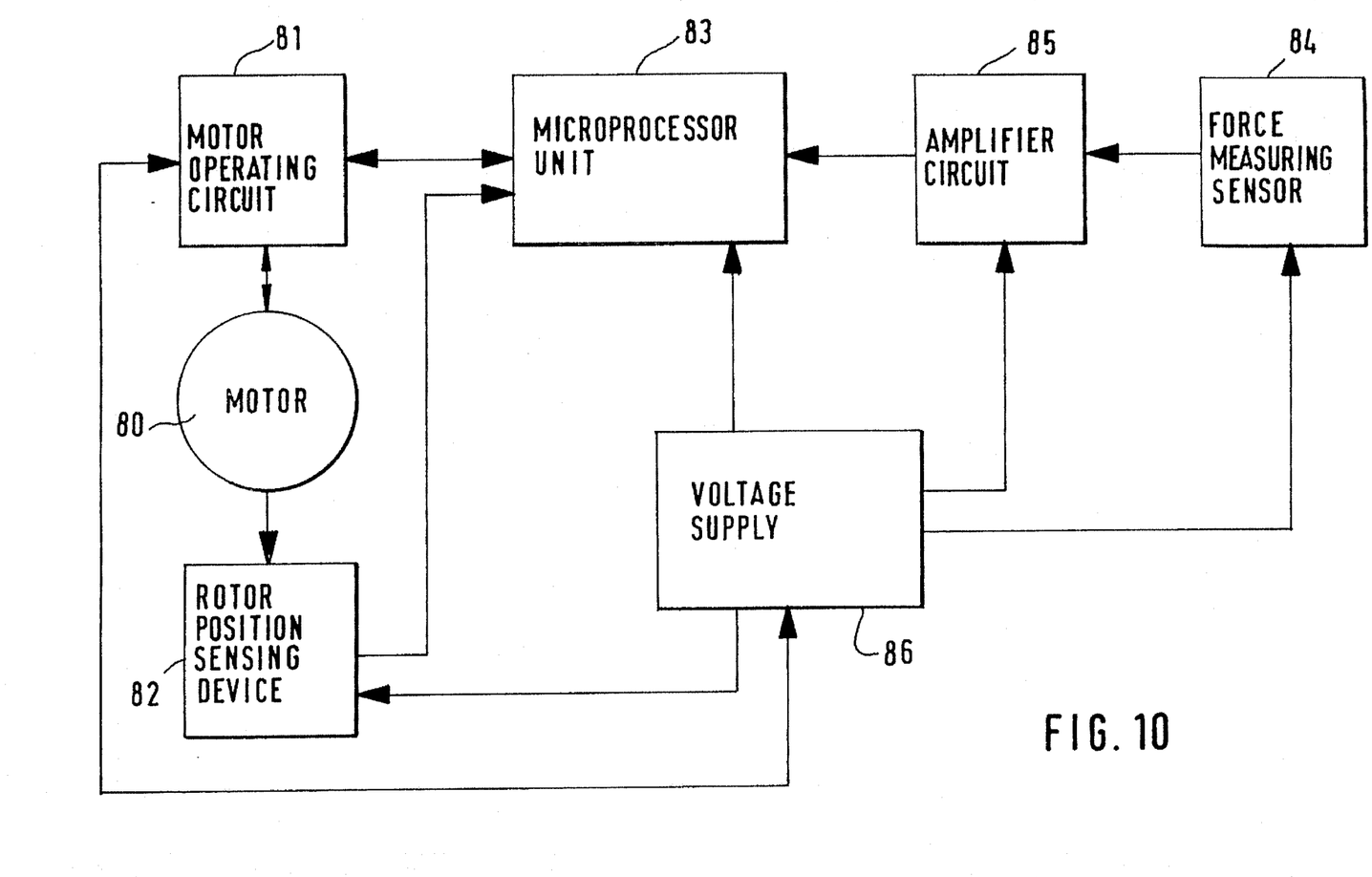
FIG. 10 shows a functional diagram of an auxiliary drive

In FIG. 10, a force measuring sensor is denoted by the reference numeral 84, this preferably being one of the measuring arrangements described above on the basis of strain gages and, in particular, a measuring element having at least one set of four strain gages interconnected to form a measuring bridge, according to FIGS. 8 and 9. The output signals of the force measuring sensor 84 are fed via an amplifier circuit 85 to the microprocessor unit 83.

A voltage supply 86, also shown in FIG. 10, includes in the embodiment described here a storage battery and a switching voltage controller, fed by the storage battery, for the generation of constant supply voltages. As can be seen from FIG. 10, the supply voltage 86 supplies operating voltages to all the functional units 81 to 85 described, the reverse situation applying in cases in which the motor 80 operates as a generator, with the voltage supply 86 also being fed, via the motor operating circuit 81, a voltage, which charges the storage battery.

In the embodiment described here, the voltage supply includes a supplementary circuit, which responds to an initial generator voltage of the motor 80 and puts into operation, or operational readiness, the switching voltage controller and consequently, by means of the commencing operating voltage generation, the other functional groups 81 to 85. Such an initial generator voltage is generated when a travelling device using the auxiliary drive described, for example a golf caddie, is set in motion. In this case, the user of the device does not need to actuate any switch to establish operational readiness. Thus, due to the automatic switching-on, the auxiliary drive does not require any special attention.

In travelling operation, the amplified signal of the force measuring sensor 84 is constantly available at the microprocessor 83 for processing and is sampled and processed according to the programming of the microprocessor unit. The microprocessor compares the measuring signal of the force measuring sensor with a predetermined set value and calculates control signals which can be used for resetting the sensor signal to the set value. These control signals are fed to the motor operating circuit 81 in order to control end stages of the motor operating circuit supplying motor operating voltages, so that the motor changes its torque according to the automatic controlling to be performed. If the pulling or pushing force actually to be exerted for moving the travelling device lies above a predetermined pulling or pushing force to be exerted by the user, relief is provided by increasing the torque of the drive motor and the force measuring sensor generates a correspondingly reduced signal. According to the automatic controlling, the relief continues until a match is achieved between the predetermined set value and the force measuring sensor signal received by the microprocessor unit. If, on the other hand, the pulling or pushing force to be exerted does not reach the predetermined pulling or pushing force, so that it is found in the comparison in the microprocessor unit 83 that the set value is not reached, the microprocessor unit 83 calculates control signals for the motor 80 to be operated as a generator, so that the motor generates a braking power suitable for correcting the set-value deviation.

If a three-phase synchronous motor is used, the microprocessor 83 calculates the control signals for controlling the phases of the motor operating voltages in a suitable time sequence, with the inclusion of measuring signals of the rotor-position sensing device, from which the microprocessor unit calculates the angular position of the rotor. The calculation of the control signals fed to the motor Operating circuit 81 is thus performed on the basis of the respective rotor position, thereby making it possible at any time to set the optimum position of the rotary field corresponding to the rotor position and consequently to ensure a maximum applied torque on the rotor.

The rotor-position sensing device preferably comprises two analog Hall generators which generate two signals offset with respect to each other by 90° with the aid of the rotor magnets or an additional magnet arrangement. On account of the orthogonality of the signals thus obtained, the magnetic rotor angle can be calculated from this in a quasi-linear form, i.e. with high resolution and an extremely short acquisition time, with the aid of a mathematical function of the form $\alpha=\arctan(a/b)$.

From the position signals constantly supplied in high time resolution by the rotor-position sensing device, all further system variables, such as for example the rotary speed, of the rotor can be determined. For determining the rotary speed, the microprocessor unit 83 differentiates the determined positional angle of the rotor over time. In the embodiment described here, the motor control is performed exclusively under program control by means of the microprocessor unit, i.e. the motor characteristic is determined by the software by which the microprocessor unit is operated. This software solution permits a highly efficient, quickly responding automatic control, even when there is rapid changing of the pulling or pushing load. The user of a travelling device equipped with the auxiliary drive has the impression that the device always opposes a movement with the same resistance, irrespective of whether the movement is accelerated, retarded, uphill or downhill, and that the device can thereby be moved largely without any jerking.

In the embodiment described here, the rotor-position sensing device comprises Hall generators which are activated via the stator magnets or an additional magnet arrangement and from the signals of which the microprocessor unit 83 can in each case determine the angular position of the rotor. However, a pickup supplying counting pulses and integrated in any case in a three-phase motor could also be used for angular position determination, it being possible for the positional determination to be performed by the microprocessor unit under program control by means of an upward and downward counting.

In the embodiment shown, the microprocessor unit 83 receives any error signals there may be from the output stages of the motor operating circuit 81, by means of which signals a safety shut down of the auxiliary drive can be triggered in the event of a fault.

If, as in the embodiments shown above, there are in each case two drive motors integrated in wheels, the microprocessor calculates the control signals fed to the motor operating circuit 81 separately for each motor, it being possible to include in the calculation of the control signals not only the rotor positions but also the motor speeds, calculated from the rotor positions, and also signals of the force measuring sensor representative of transverse forces. Consequently, different running paths and rotational speeds of the wheels are taken into account. In the case of a golf caddie having two wheels, it can be additionally achieved, in a way corresponding to the automatic control described, that turning of the caddie, and in particular turning in place, is possible by applying a relatively small torque, to be applied by the user, in that the turning as such is also boosted by the auxiliary drive. When turning in place, the auxiliary drive would then drive the wheels in opposite directions of rotation.

The program control of the microprocessor unit 83 could be provided in such a way that the set value is changed as a function of the motor speed, and consequently as a function of the speed of the travelling device, in such a way that the user always has to exert the same force irrespective of the speed with which he is moving the device. Thus, the driving force which has to be exerted by the user at a relatively high speed should be reduced. The microprocessor unit 83 could also be connected to an input unit, via which the driving power to be exerted can be set as desired.

Figure 11:
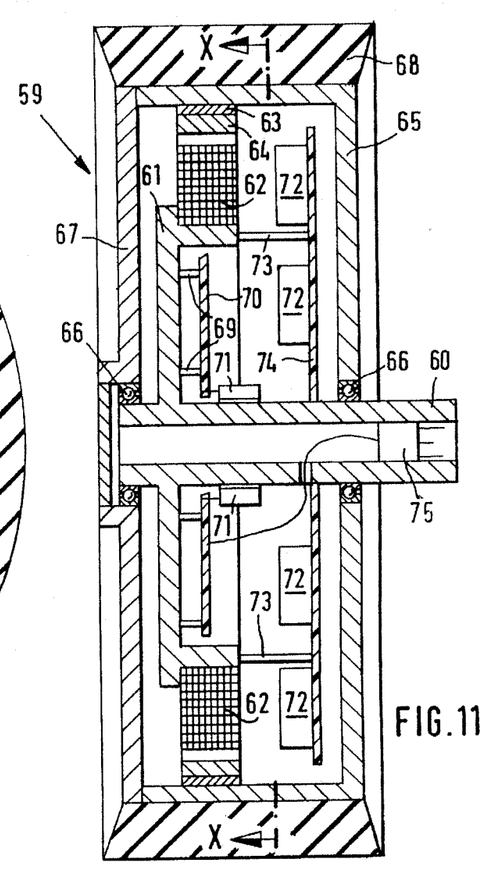
FIG. 11 shows a wheel in an axial section and FIG. 12 shows a section along line X—X in FIG. 9.
Figure 12:
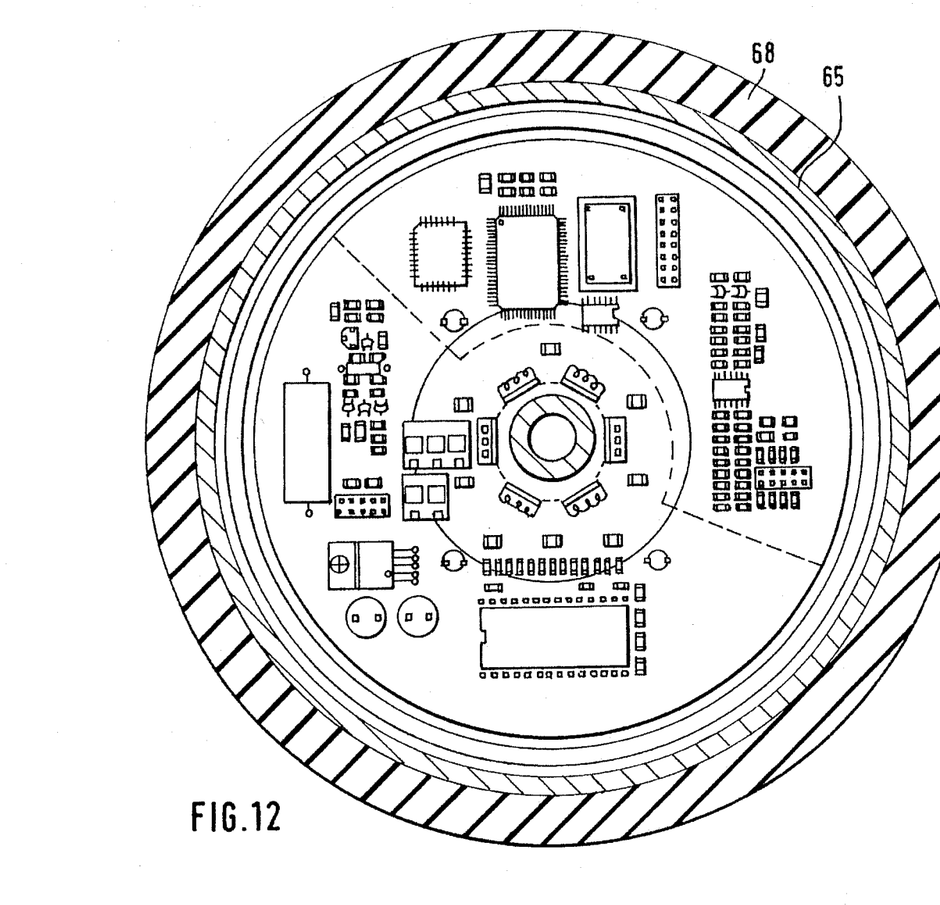

FIGS. 11 and 12 show a wheel 59 with in addition to the motor integrated batteries and integrated control. The motor has in principle the same construction as in FIG. 5: a stator plate 61 formed integrally with an axle journal 60 bears a row of stators 62, to which there is assigned a ring of magnets 64, provided with a pole ring 63, on the rotating part of the wheel 59 designed as housing 65. The housing 65 is arranged with bearings 66 on the axle journal 60; its one wall comprises a removable housing cover 67. A tire 68 is seated here directly on the housing 65.

An annular circuit board 70 is fastened by means of pins 69 on the stator plate 61 at some distance from it. It bears, above the dashed line in FIG. 12, the control electronics and, below the dashed line, the power electronics, including power transistors 71 bearing against the axle journal 60. The batteries 72 are fitted on a carrier plate 74, which is seated on the axle journal 60 and is connected by webs 73 to the stator plate 61.

In a way similar to on the axle journal 33, provisions for a mechanical plug connection of the wheel 59 to a device frame are conceivable on the axle journal 60. Combined therewith is an electric plug connection 75, which provides the connection to the measuring device.

The wheel 59 is envisaged, for example, for an industrial cart.

I claim:

1. A travelling device driven by a primary driving force exerted by human or animal power, the travelling device comprising an electric auxiliary drive, the auxiliary drive comprising a drive means for producing a driving torque for exerting a boosting effect when a required driving force exceeds the primary driving force and for producing a regenerative braking torque for exerting a regenerative effect when the required driving force is smaller than the primary driving force, a measuring device for measuring the primary driving force exerted by human or animal power, and control means for adjusting a predetermined primary driving force such that, when the predetermined primary driving force is exceeded, the driving torque is increased or the regenerative braking torque is decreased, and, when the predetermined primary driving force is not reached, the driving torque is decreased or the regenerative braking torque is increased.

2. The travelling device according to claim 1, further comprising means for arbitrarily adjusting the predetermined primary driving force.

3. The travelling device according to claim 1, comprising means for adjusting the predetermined primary driving force by a control program.

4. The travelling device according to claim 1, wherein the drive means comprises a three-phase synchronous motor.

5. The travelling device according to claim 1, comprising a device frame and two coaxial wheels attached to the device frame, each wheel comprising a separately controlled motor, wherein proportions of the primary driving force for each wheel are determined from a measurement of a bending moment or a transverse force occurring in the device frame.

6. The travelling device according to claim 1, comprising an axle having a shape of an elongated case, gearlessly integrated motors being mounted on the axle, and wherein batteries are housed in the axle.

7. The travelling device according to claim 1, comprising a device frame and wheels attached to the device frame, each wheel comprising an integrated motor and an integrated battery.

8. The travelling device according to claim 7, wherein the motors are gearlessly integrated in the wheels.

9. The travelling device according to claim 7, wherein the control means are integrated in the wheels.

10. The travelling device according to claim 6, further comprising axle journals fastened to the axle by means of rotationally secure plug connections, further comprising plug connections combined with the rotationally secure plug connections for control lines extending into each wheel.

11. The travelling device according to claim 10, wherein additional supply lines extend through the plug connections for the control lines.

12. The travelling device according to claim 5, wherein the device frame comprises a crosspoint through which an entire flow of force of the primary driving force passes, wherein the measuring device for measuring the primary driving force is located in the crosspoint.

13. The travelling device according to claim 12, wherein the measuring device comprises means for measuring the bending moment and the transverse force.

14. The travelling device according to claim 12, wherein the device frame further comprises a handle and a draw bar extending at an angle relative to the handle, the crosspoint being located between the handle and the draw bar.

15. The travelling device according to claim 12, wherein the measuring device comprises a molded component, the molded component having openings defining webs where bending stresses are concentrated, further comprising strain gages attached to the webs.

16. The travelling device according to claim 15, wherein the molded component is embedded in a plastics compound.

17. The travelling device according to claim 12, wherein the measuring device comprises pairs of strain gages arranged next to one another such that one strain gage is stretched when another of the strain gages is compressed, the strain gages being arranged in a bridge circuit and a tapping point being located between the strain gages.

18. The travelling device according to claim 16, wherein the plastics compound is attached in a force-transmitting manner to the device frame.

19. The travelling device according to claim 6, wherein the travelling device is a golf cart, the device frame supporting a golf bag, the device frame further comprising two upwardly converging bars rigidly attached to the axle having the form of an elongated case, the two bars having outwardly bent upper ends, a draw bar being attached to the upper ends of the bars, a handle being attached to the draw bar, further comprising a carrying rack attached at two joints to the axle so as to be swingable between a supporting position and a position in which the carrying rack rests against the two bars, and wherein the measuring device is located at a transition between the two bars and the draw bar.

20. The travelling device according to claim 6, wherein the travelling device is a golf cart, the device frame supporting a golf bag, the device frame further comprising two upwardly converging bars rigidly attached to the axle having the form of an elongated case, the two bars having outwardly bent upper ends, a draw bar being attached to the upper ends of the bars, a handle being attached to the draw bar, further comprising a carrying rack attached at two joints to the axle so as to be swingable between a supporting position and a position in which the carrying rack rests against the two bars, and wherein the measuring device is located at a transition between the draw bar and the handle.

21. The travelling device according to claim 17, wherein the bridge circuit comprises two pairs of strain gages, the pairs including strain gages arranged diagonally relative to one another, such that one strain gage of the pair is stretched when another of the pair is compressed.

22. The travelling device according to claim 5, comprising a starting circuit responding to a generator voltage of each motor for establishing an operational readiness of the auxiliary drive.

23. The travelling device according to claim 5, wherein the control means comprises a microprocessor unit for receiving a signal from the measuring device, a motor operating circuit connected to the microprocessor unit and output stages for supplying motor operating voltages, and a device for determining an angular position of a rotor in each motor, the microprocessor unit serving for calculating control signals to be fed to the motor operating circuit including the determined angular position of the rotor.

24. The travelling device according to claim 1, wherein the control means comprises means for adjusting the predetermined primary driving force such that a user of the travelling device applies a constant driving power irrespective of the speed of the travelling device.

* * * * *